(12) United States Patent
Achtner et al.

(10) Patent No.: US 8,872,071 B2
(45) Date of Patent: Oct. 28, 2014

(54) COOLING OF A WELDING IMPLEMENT

(75) Inventors: Richard Mark Achtner, Appleton, WI (US); Galen White, Gartlett, IL (US)

(73) Assignee: Illinois Tool Works Inc., Glenview, IL (US)

( * ) Notice: Subject to any disclaimer, the term of this patent is extended or adjusted under 35 U.S.C. 154(b) by 1816 days.

(21) Appl. No.: 12/116,784

(22) Filed: May 7, 2008

(65) Prior Publication Data
US 2009/0277892 A1 Nov. 12, 2009

(51) Int. Cl.
*B23K 9/16* (2006.01)
*F28D 15/00* (2006.01)
*B23K 9/28* (2006.01)

(52) U.S. Cl.
CPC ............................ *B23K 9/285* (2013.01)
USPC ............................. 219/137.62; 165/104.21

(58) Field of Classification Search
USPC ............... 219/229, 230, 238, 241, 245, 61.7, 219/76.11, 86.31, 120, 121.33, 121.49, 219/137.62, 137.9; 165/104.26, 104.21
See application file for complete search history.

(56) References Cited

U.S. PATENT DOCUMENTS

| | | | |
|---|---|---|---|
| 2,350,348 A | 6/1944 | Gaugler | |
| 4,109,131 A * | 8/1978 | Schluter | 219/137.62 |
| 6,211,490 B1 * | 4/2001 | Nosse | 219/137.62 |
| 6,573,470 B1 | 6/2003 | Brown et al. | |
| 6,766,817 B2 | 7/2004 | da Silva | |
| 6,918,404 B2 | 7/2005 | Dias da Silva | |
| 7,066,856 B1 | 6/2006 | Rogers | |
| 7,244,398 B2 | 7/2007 | Kotary et al. | |
| 7,285,255 B2 | 10/2007 | Kadlec et al. | |
| 2003/0146264 A1 | 8/2003 | Miyazaki | |
| 2005/0006365 A1 | 1/2005 | Kooken | |
| 2005/0072763 A1 * | 4/2005 | Delgado | 219/75 |
| 2007/0094928 A1 | 5/2007 | Hunter | |
| 2007/0204974 A1 * | 9/2007 | Gupta et al. | 165/104.21 |
| 2007/0292314 A1 | 12/2007 | Effenhauser et al. | |
| 2008/0015531 A1 | 1/2008 | Hird et al. | |

FOREIGN PATENT DOCUMENTS

| | | |
|---|---|---|
| DE | 20118940 U1 | 1/2002 |
| GB | 1437456 A | 5/1976 |

OTHER PUBLICATIONS

PCT International Search Report; PCT/US2009/042804; 3 pages, 2009.
Weldcraft, Introducing the CS 300 High Performance Air Cooled TIG Torch, www.weldcraft.com, Burbank, CA (2004).

* cited by examiner

*Primary Examiner* — Brian Jennison
(74) *Attorney, Agent, or Firm* — Quarles & Brady, LLP

(57) ABSTRACT

A welding implement and a method of extracting heat from a welding implement are disclosed. The welding implement includes one or more heat pipes which transfer thermal energy away from the torch head. A fluid, such as a shielding gas, may then convectively transfer the thermal energy away from the welding implement. The present invention thus provides a handheld welding implement that is compact, such that it can be used in confined spaces, and operated for longer periods of time, since the improved heat dissipation helps to maintain the welding implement at a temperature that an operator may hold.

20 Claims, 8 Drawing Sheets

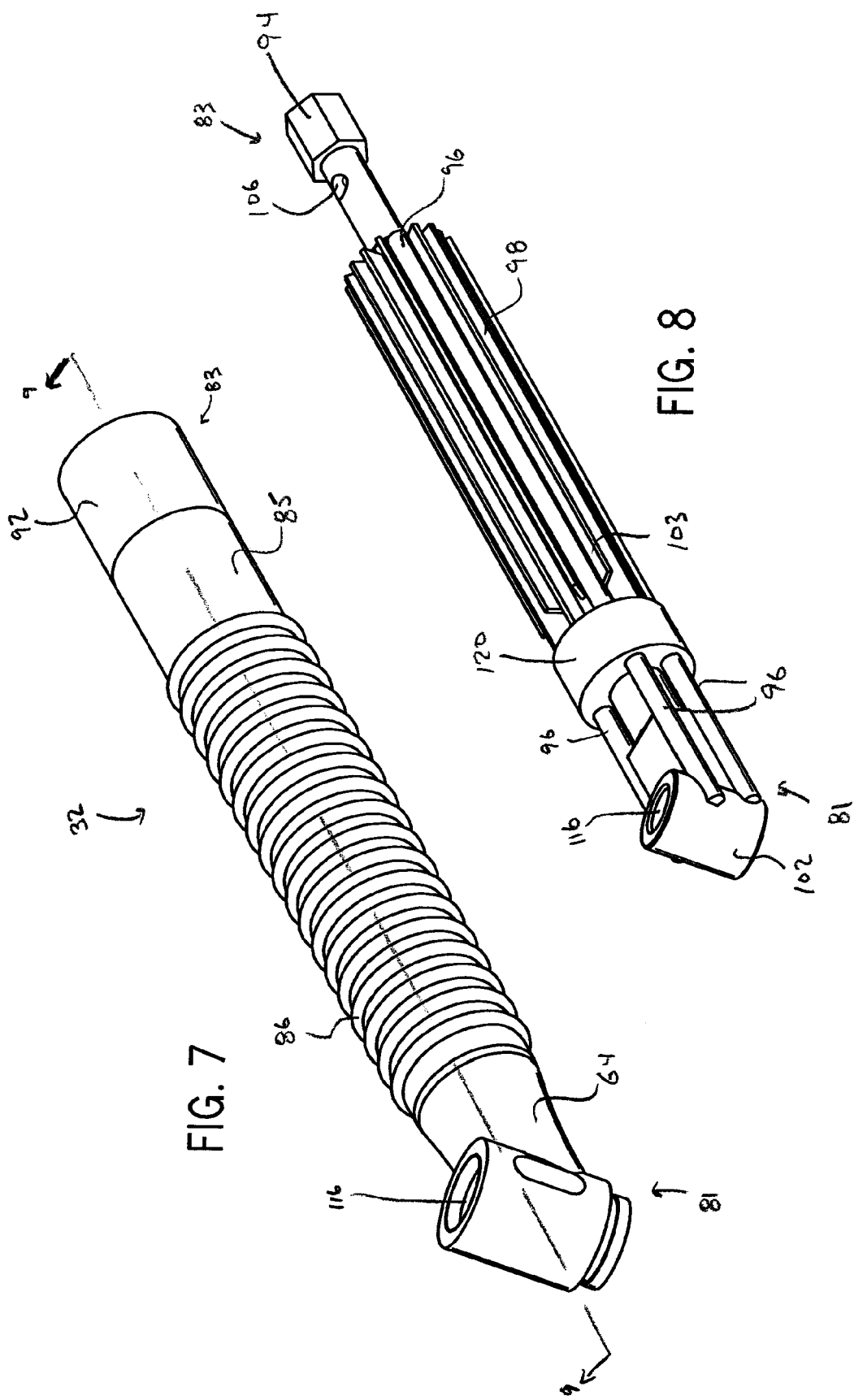

COOLING OF A WELDING IMPLEMENT

REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to welding implements and, more particularly, to cooling systems for welding implements.

Welding is a fabrication process for joining two or more materials together by heating the materials and allowing them to flow together. In one type of welding, gas tungsten arc welding (GTAW), an electrical current is directed through a non-consumable tungsten electrode housed in a welding implement, such as a torch. The current arcs from the electrode to a work piece, which is placed within the welding circuit. The heat generated by the arc can cause the work piece to melt and form a weld. In other types of welding, such as gas metal arc welding (GMAW), a consumable filler wire is fed through a welding implement (i.e., a gun) as an electrical current heats the wire and the work piece. The filler wire melts and is deposited on the work piece, forming the weld.

During the welding process, large amounts of heat are generated near the arc. This heat is transferred not only to the work piece to form the weld, but also to the components of the welding implement. In particular, the torch head can experience an extreme rise in temperature. Additionally, the current-carrying components of the welding implement can heat due to resistance heating. This rise in temperature can detrimentally affect the longevity and operability of the welding implement.

Increasingly, the market is demanding welding implements that are smaller, for more maneuverability, but that can also carry more current, for increased weld depth penetration. These compact, high-powered welding devices require improved techniques of heat dissipation. Many attempts have been made to improve the transfer of heat out of welding implements, especially during extended use.

Heat regulation in traditional welding implements has been addressed in a variety of ways with marginal results. For example, in TIG welding applications, the welding implement (i.e., torch) typically includes copper or brass current-carrying components that are designed to conduct heat away from the head of the torch toward the base of the torch body. Lower-temperature shielding gas is then passed over the torch body in an attempt to remove the heat from the torch via forced convection. To improve heat transfer, the component size has been increased to provide more heat carrying capacity. However, this approach results in a larger torch with less maneuverability.

Another technique incorporates a torch handle or body having ribs or fins to help increase the rate of heat dissipation to the surrounding environment. Again, however, this approach leads to a larger torch making it less desirable for certain applications.

Yet another cumbersome technique involves liquid-cooled welding implements. A liquid coolant is circulated via pump within the welding component where it comes into contact with and cools higher-temperature components. Distinct coolant passages are designed into the welding implement to maximize the heat removal. This technique has the obvious drawback of requiring an additional liquid coolant circulation system in addition to a larger welding-type gun to accommodate the cooling passageways.

Therefore, it would be desirable to have a compact, self-contained welding implement capable of autonomously regulating the temperature of the welding implement during use.

BRIEF SUMMARY OF THE INVENTION

The present invention overcomes the aforementioned drawbacks by providing a welding implement and method that efficiently extracts heat from the welding implement via a closed system. Thus, the present invention effectively regulates the temperature of the welding implement during operation without substantially increasing the size of the welding implement or requiring any additional equipment to circulate coolant.

In accordance with one aspect of the present invention, a welding implement is disclosed that is coupleable to a power supply that is capable of imparting thermal energy to the welding implement. The welding implement includes a body, a head, a heat pipe, and a fluid channel. The body has a proximal end and a distal end, the proximal end being coupleable to the power supply. The head is proximate the distal end of the body and receives the thermal energy imparted to the welding implement from the power supply. The heat pipe has a closed passage containing a working fluid in thermal communication with the head to extract at least a portion of the thermal energy from the head. The fluid channel extends over at least a portion of the heat pipe to receive a cooling fluid flowing from the proximal end toward the head.

Variations may be made to this welding implement. The welding implement may further include a plurality of heat pipes. A thermal energy sink may contact at least a portion of the heat pipe. The casing of the heat pipe may be formed of a conductive material configured to carry a welding current.

Additionally, the welding implement may include at least one input into the fluid channel located proximate the proximal end and at least one output located proximate the head to direct the cooling fluid toward the welding implement. There may be a handle having an inner surface that forms at least a portion of the fluid channel.

In accordance with another aspect of the invention, a welding implement is disclosed that includes a torch having a proximal end and a distal end. The proximal end is adapted for connection to a power supply. The torch has a torch head located proximate the distal end of the torch. The torch head is adapted for holding an electrode. The welding implement also has a heat pipe that forms a closed passage extending substantially from the torch head toward the proximal end of the torch. The welding implement also includes a handle surrounding at least a portion of the torch and at least a portion of the heat pipe. A working fluid is captured in the closed passage of the heat pipe and migrates substantially between the torch head and the proximal end of the torch to transfer thermal energy away from the torch head. In some forms, this working fluid may include water, helium, mercury, sodium, ammonia, ethanol, and methanol.

Variations may be made to this welding implement. For example, a thermal energy sink may contact at least a portion the heat pipe. If there is a thermal energy sink, at least one fin may extend from the thermal energy sink. The welding implement may further include a channel formed between the handle and the heat pipe or the thermal energy sink as well as include at least one passage into the channel to direct a fluid therethrough to extract thermal energy from the heat pipe, possibly through the thermal energy sink. The fluid may include at least one of a shielding gas and a liquid coolant. The welding implement may further include at least one passage extending from the channel toward the electrode to allow the fluid to pass from the channel.

According to yet another aspect of the invention, a method for extracting heat from a welding implement is disclosed. Thermal energy is transferred from the torch head to the working fluid. At least a portion of the working fluid within the heat pipe is evaporated and is directed from a location in the heat pipe proximate the torch head to a location in the heat pipe proximate the proximal end of the torch. The thermal energy is then transferred from the working fluid in the heat pipe at a location proximate the proximal end of the torch. A fluid is directed about the heat pipe to extract thermal energy therefrom and condense the working fluid at the location in the heat pipe proximate to the proximal end of the torch. The fluid may include a shielding gas or a liquid coolant. The method may further include the step of transferring the thermal energy from at least a portion of a thermal energy sink attached to the heat pipe to the fluid to direct the thermal energy away from the portion of the thermal energy sink. The method may also include the step of wicking of the working fluid in the heat pipe back to a location proximate the torch head via a wick.

Various other features of the present invention will be made apparent from the following detailed description and the drawings.

BRIEF DESCRIPTION OF THE SEVERAL VIEWS OF THE DRAWINGS

The invention will hereafter be described with reference to the accompanying drawings, wherein like reference numerals denote like elements, and:

FIG. 7 is an isometric view of the torch in accordance with another aspect of the present invention;

FIG. 8 is an isometric view of the torch of FIG. 7 with the handle removed to reveal the interior components.

DETAILED DESCRIPTION OF THE INVENTION

The present invention is applicable to a variety of welding implements including, but not limited to, TIG torches, GMAW guns, shielded metal arc welding (SMAW) holders, plasma torches, and the like. The following example embodiments will make reference to TIG welding only for convenience of explanation. The present invention is equally applicable to many other welding-type processes.

Figure 1:
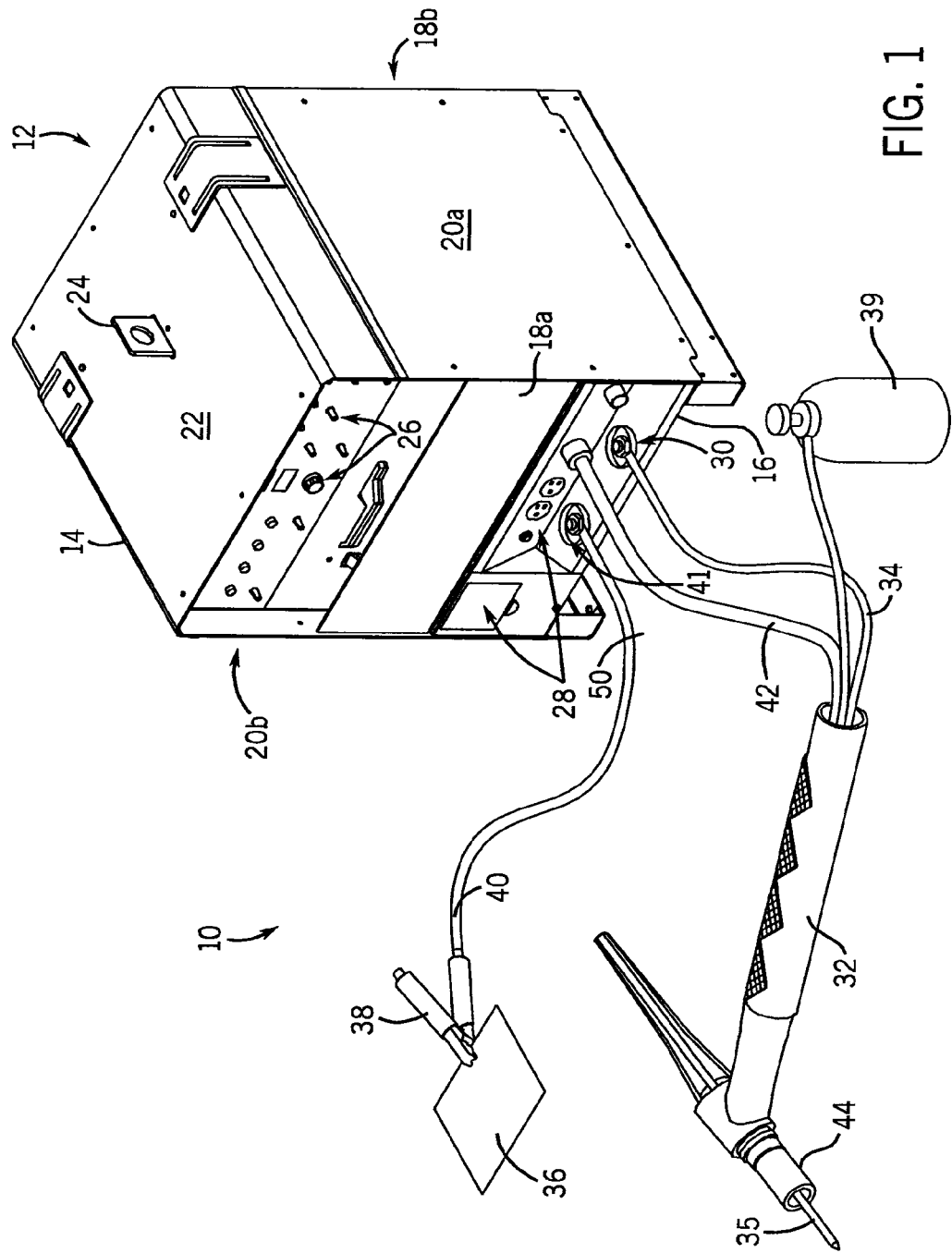
FIG. 1 an isometric view of a welding-type system incorporating the present invention.

Referring now to FIG. 1, a welding system 10 suitable for a number of welding processes, including gas tungsten arc welding (GTAW) and tungsten inert gas (TIG) welding, includes a power supply 12 disposed within an enclosure 14. The power supply 12 is configured to condition raw power, for example from a transmission power line, into a power suitable for welding. The enclosure 14 is defined by a base 16, front and back panels 18a, 18b, and a pair of side panels 20a, 20b attached to the base 16. A top cover 22 having a handle 24 is secured to the pair of side panels 20a, 20b to form the enclosure 14. The front panel 18a includes control knobs 26 and outlets and receptacles 28 to facilitate the connection of welding accessories to the power supply 12. A welding gun output terminal 30 is provided to connect a torch or gun 32 to the power supply 12 via welding cable 34. The gun 32 is designed to hold a tungsten electrode 35. To complete a welding circuit, a clamp 38 is provided to connect a workpiece 36 to the power supply 12 via a cable 40 and workpiece output terminal 41. A gas cylinder 39 is used to store gas that is delivered to the torch 32 during the welding process.

In addition to the power supply 12, the enclosure 14 may also house an optional cooling system (not shown) designed to regulate the temperature of the gun 32 and the component internal to the enclosure 14. In this regard, the optional cooling system is designed to circulate coolant to and from the gun 32 via a coolant conduit or path 42.

Figure 2:
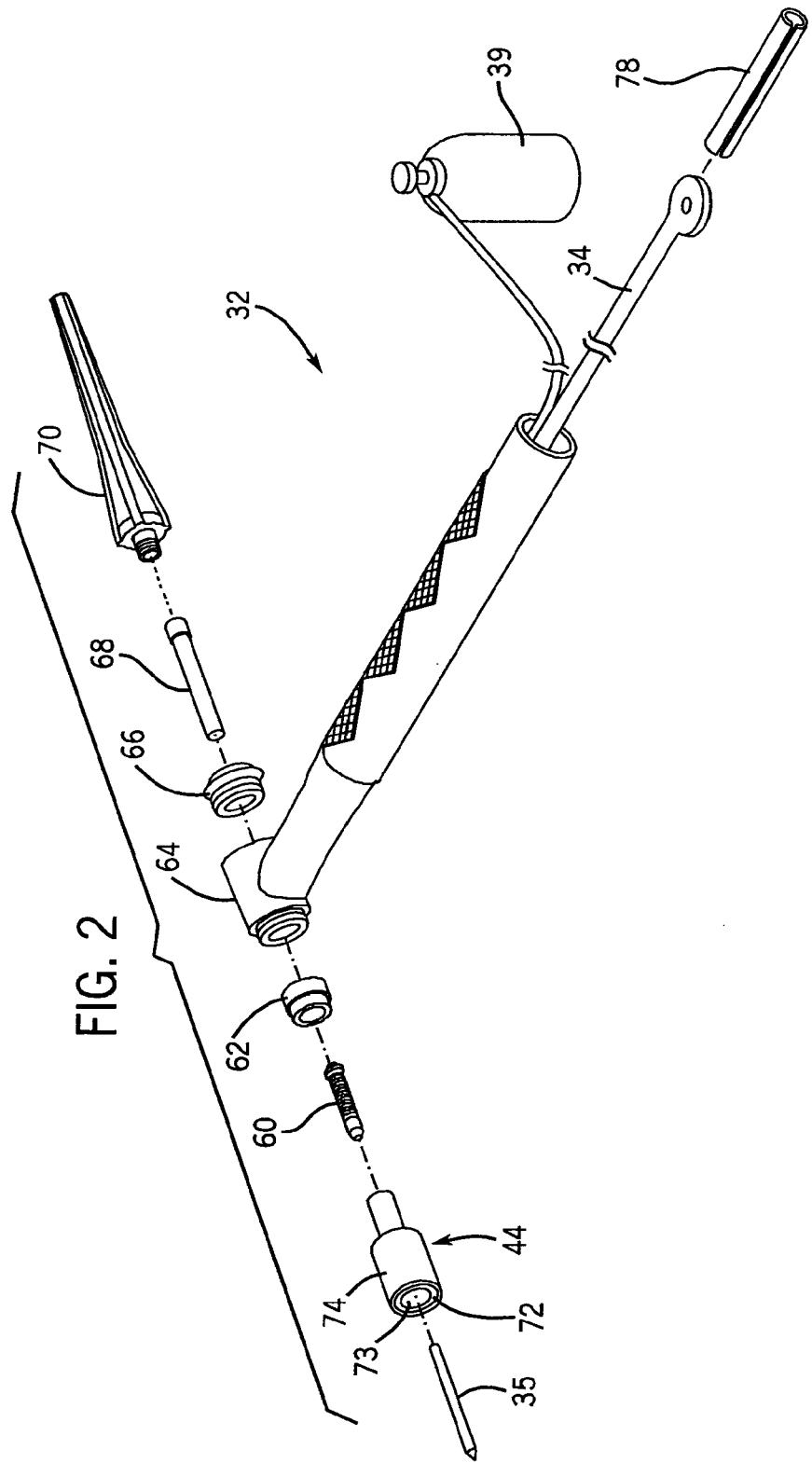
FIG. 2 is an exploded view of an example welding implement incorporating the present invention.

Referring now to FIG. 2, an exploded view of the welding gun 32 of FIG. 1 is shown. The welding gun 32 includes the tungsten electrode 35 that is configured to be partially surrounded by the nozzle assembly 44. As will be described, the nozzle assembly 44 may include multiple configurations. A collet body 60 is configured to engage the electrode 35 and pass through a nozzle insulator 62, a torch body 64, and backcap insulator 66 to engage a collet 68. The collet 68, in turn, engages a backcap 70.

The nozzle assembly 44 is formed of multiple components. The nozzle assembly 44 includes a non-conductive nozzle 72 that, for example, may be formed of porcelain or ceramics. The non-conductive nozzle 72 defines a hollow or open inner portion or chamber 73. In this regard, the non-conductive nozzle 72 may be formed as a cylinder to allow the tungsten electrode 35 to pass therethrough. It is contemplated, however, that the non-conductive nozzle 72 may be formed in other geometrical shapes, such as frusto-conical shape.

Figure 3:
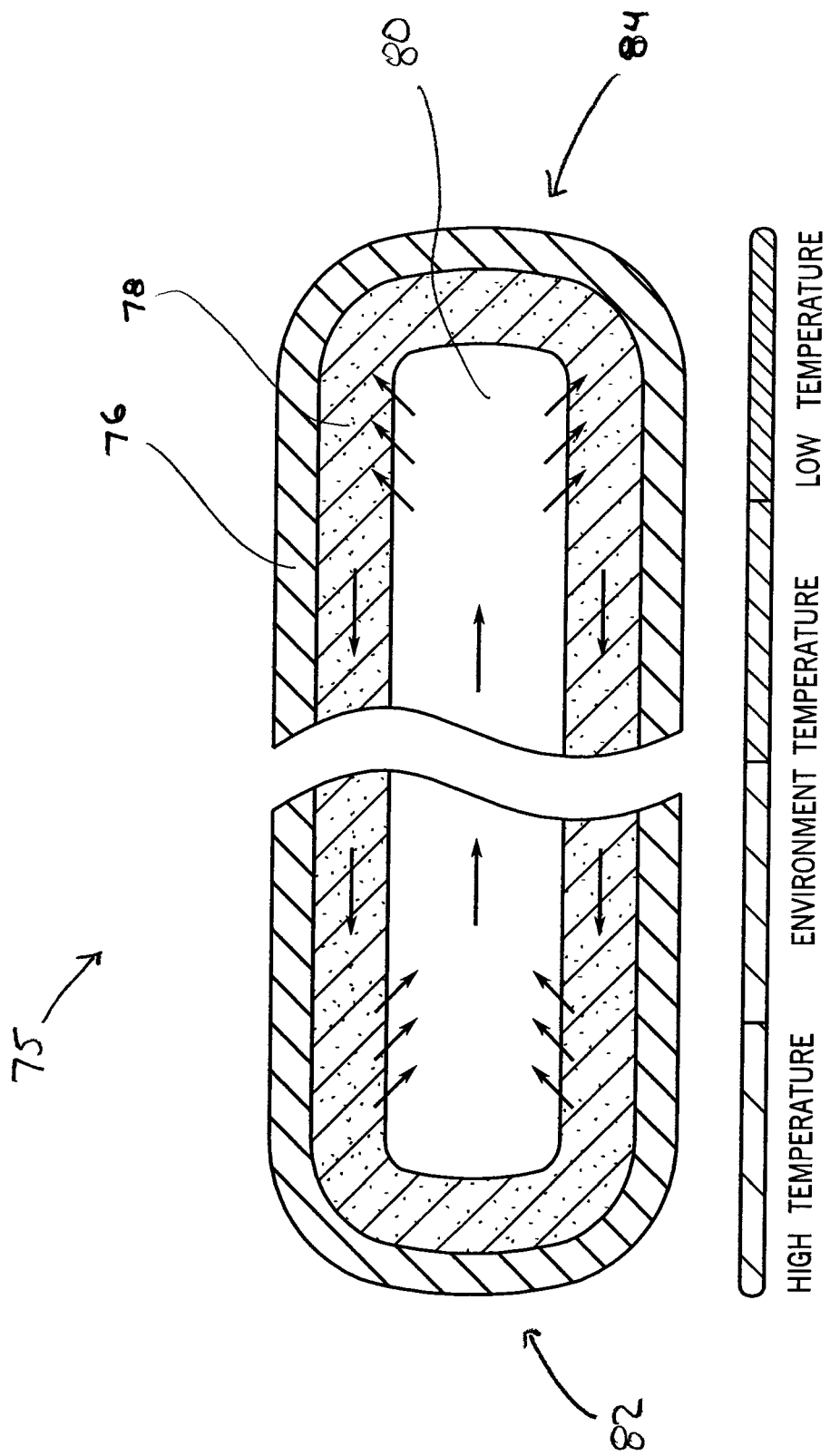
FIG. 3 is a cross-sectional side view of an exemplary heat pipe.

Referring now to FIG. 3, a cross-sectional view of a heat pipe 75 is shown. The heat pipe 75 includes a casing 76 and a passageway including a wick 78 and a vapor cavity 80. For ease of reference, the heat pipe 75 will be described as having a first end 82 and a second end 84. The heat pipe 75 contains a working fluid that is capable of being in a vapor or a liquid phase. The working fluid may be any one of or a mixture of a number of fluids including, but not limited to, water, helium, mercury, sodium, ammonia, ethanol, and methanol. The working fluid is distributed between a gas phase present in the vapor cavity 80 and a liquid phase present in the wick 78. The wick 78 is a porous material that lines at least a portion of the casing 76. The size of the pores may be selected such that the working fluid is "wicked" by capillary action to portions of the wick that do not contain the working fluid. The appropriate pore size may vary depending on the surface tension of the working fluid in liquid phase and the surface energy of the material composing the wick.

The heat pipe 75 may be placed in an environment in which the heat pipe 75 is exposed to a thermal gradient over the length of the body. As shown by the environment temperature line in FIG. 3, the first end 82 is exposed to high temperatures relative to the low temperatures of the second end 84. In the presence of a thermal gradient across the length of the heat pipe 75, the heat pipe 75 may extract the energy from the high temperature side and transfer it to the low temperature side according to the thermal cycle described below and generally indicated by the directional arrows in FIG. 3.

First, the working fluid in the first end 82, which is exposed to the high temperatures, evaporates to form a vapor phase that absorbs the thermal energy from the environment. This vapor phase then migrates along the vapor cavity 80 from the higher temperature first end 82 to the lower temperature second end 84. Once the vapor phase has reached the lower temperatures of the second end 84, the vapor in the vapor cavity 80 condenses back into liquid and is absorbed by the wick 78, releasing thermal energy at the low temperature second end 84. The working fluid, now in liquid form, is wicked back towards the high temperature first end 82 via capillary action. This heat transfer is continuous and the working fluid contained within the passageway may be evaporating on one end while simultaneously condensing on the other end.

It should be appreciated that in order for this thermal cycle to be induced, the high temperature end should be at temperatures high enough to cause the working fluid to evaporate. Likewise, the low temperature end should be at temperatures low enough that the working fluid, when in vapor phase, may condense.

Because the heat pipe 75 is a closed system, the casing 76 is designed to have sufficient mechanical strength at high temperatures and high pressures. A large fraction of the working fluid may be vaporized at high temperatures, essentially turning the heat pipe 75 into a pressure vessel.

Figure 4:
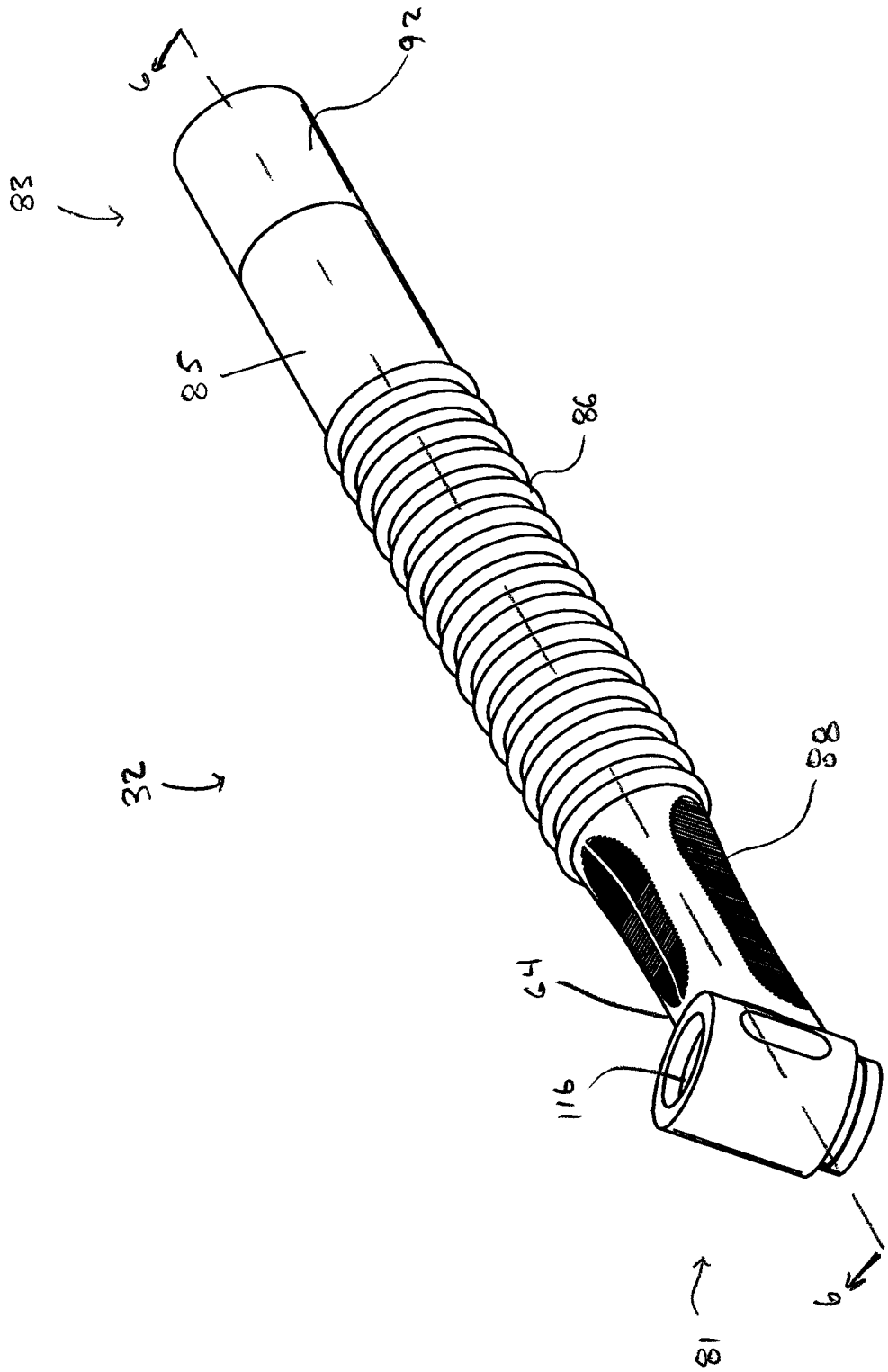
FIG. 4 is an isometric view of a torch in accordance with one aspect of the present invention.
Figure 5:
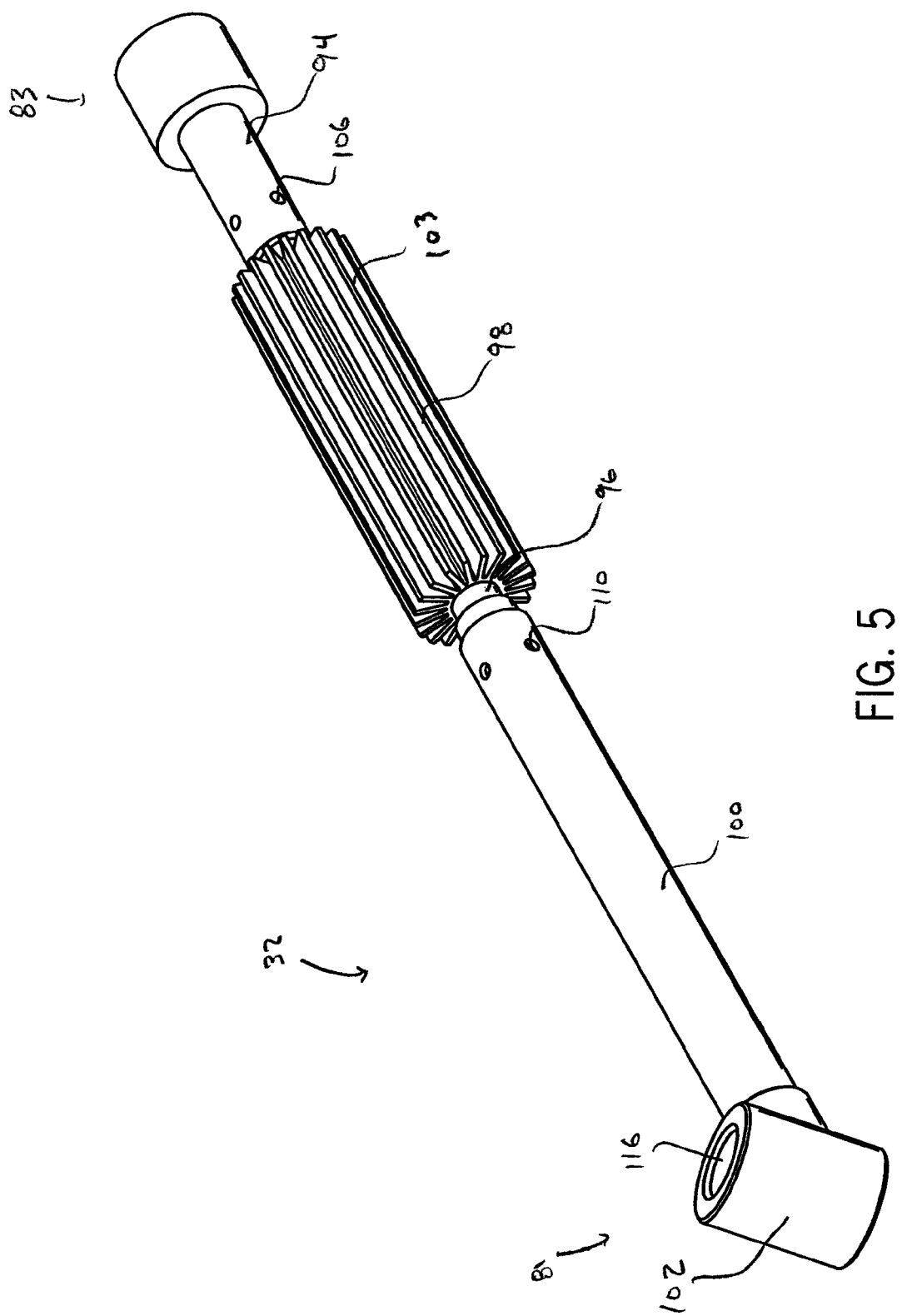
FIG. 5 is an isometric view of the torch of FIG. 4 with the handle removed to reveal the interior components.
Figure 6:
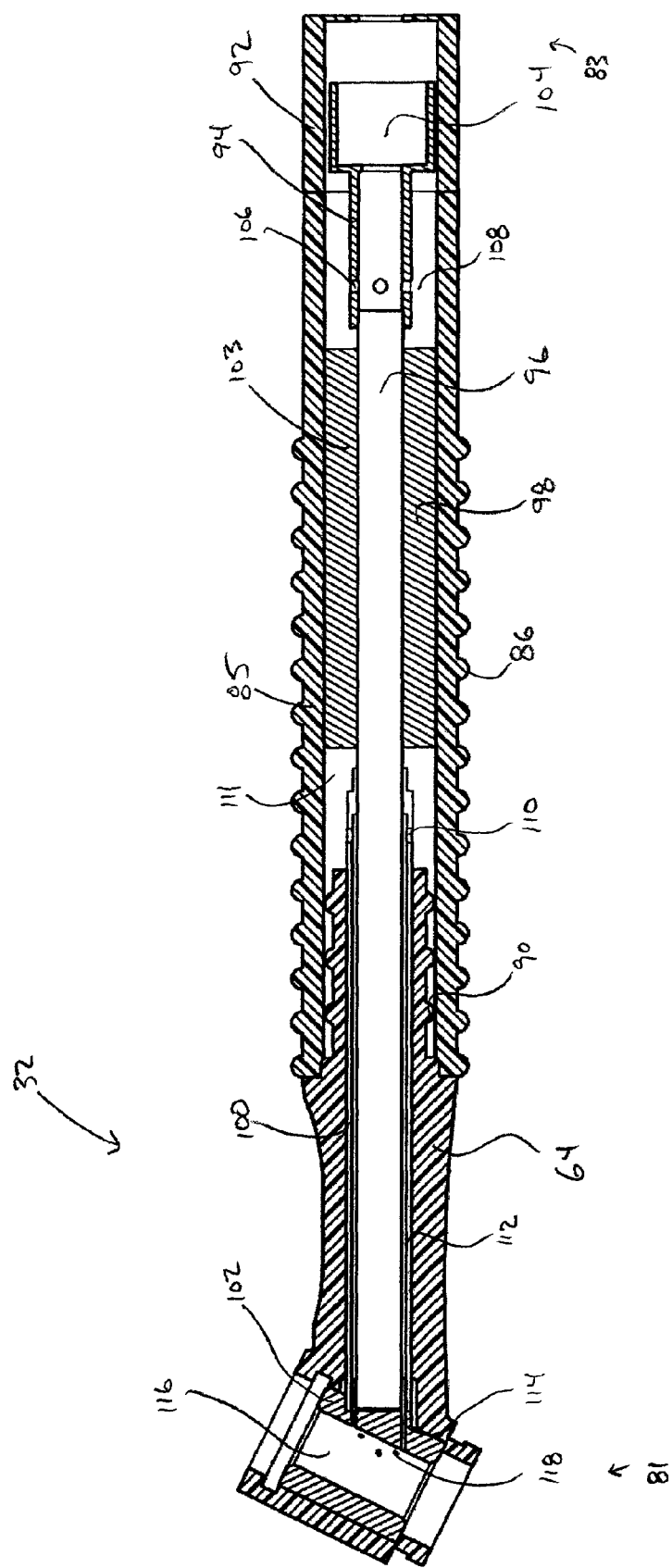
FIG. 6 is a partial cross-sectional side view of the torch of FIG. 4 along line 6-6.

Referring now to FIGS. 4-6, in accordance with one configuration of the present invention, the welding gun 32 extends from a distal end 81 to a proximal end 83 and has a torch body 64 including a handle 85 having a plurality of ribs 86. The torch body may include textured portions 88 for easy gripping. The handle 85 may be composed of a hard rubberized material. As can be seen in FIG. 6, the torch body 64 can be slid into the handle 85, such that a set of ridges 90 on the torch body 64 frictionally hold the torch body 64 in the handle 85. The end of the handle 85 includes a removable cap 92 made, for example, of a hard plastic or rubber. The set of ridges 90 and the handle 85 form one end of the fluid/gas channel, while the removable cap 92 and handle 85 form the other end of the fluid/gas channel.

Inside the torch body 64 and handle 85 are a number of internal components including a connector 94, a heat pipe 96 similar to the heat pipe 75 shown in FIG. 3, a thermal energy sink 98, a cylindrical sleeve 100, and a torch head 102. It should be noted that FIG. 6 is a partial cross-sectional view that does not include a cross section of the heat pipe 96. However, the internal components of the heat pipe 96 include a wick and casing, such as described above with respect to FIG. 3.

The connector 94 has a port 104 that is adapted for attachment to a cable that supplies power and gas. Radially-extending holes 106 extend from a location inside the connector 94 to a cavity 108 between the handle 85 and the internal components. The connector 94 also has an end that connects to the heat pipe 96.

The heat pipe 96 connected to the connector 94 extends the length of the handle 85 to contact the torch head 102. As the heat pipe 96 extends towards the torch head 102, a thermal energy sink 98 and the cylindrical sleeve 100 are also attached to the heat pipe 96. The heat pipe 96 may have a casing made from a solid conductive material such as, for example, aluminum, copper, and the like, such that it may carry the welding current.

The thermal energy sink 98 may be a separate component that contacts the heat pipe 96 or may be integrally connected to the heat pipe 96. The thermal energy sink 98 may be composed of a material having high rates of thermal conductivity, such as copper or aluminum, and may have a large surface area, such fins 103 as shown, to increase the amount of heat transferred. There may or may not exist a gap between the thermal energy sink 98 and the handle 85.

The cylindrical sleeve 100 has radially-extending holes 110 on the end of the cylindrical sleeve 100 closest to the fins 103 of the thermal energy sink 98. The radially-extending holes 110 extend from a cavity 111 to an annularly extending channel 112 formed between the cylindrical sleeve 100 and the heat pipe 96. The annularly extending channel 112 extends from the connection between the heat pipe 96 and the cylindrical sleeve 100 to a location where the heat pipe 96 and cylindrical sleeve 100 attach to the torch head 102.

It should be noted that in this configuration, the cavities 108 and 111 are in communication with one another such that a gas can flow from one cavity to another. Thus, the thermal energy sink 98 either has a geometry that permits the communication of the cavities 108 and 111 with one another or has a gap between the thermal energy sink 98 and the handle 85 that permits the communication of the cavities 108 and 111 with one another.

The torch head 102 has a set of channels 114 that extend from the annularly extending channel 112 to an inner bore 116 of the torch head 102. At the points where the inner channels 114 intersect the surface of the inner bore 116 are a plurality of holes 118.

In operation, a gas and power supply cable 34 is connected to the connector 94, to supply a gas and current to the torch 32. The current supplied by the cable 34 is conducted and travels through the connector 94, through the heat pipe 96, and to the torch head 102 to supply a current to the electrode 35 of FIGS. 2 and 3. As the welding process generates heat at and near the torch head 102, the heat pipe 96 transfers the thermal energy from the torch head 102 away from the torch head 102 and to the thermal energy sink 98. At the thermal energy sink 98, the thermal energy may be dispersed over a large area, such as the fins 103. In this way, the intense heat generated by the welding process is directed away from the torch head 102 such that the welding process may occur for a longer period of time without the welding components becoming excessively hot.

Simultaneously, a fluid, such as an inert shielding gas, flows from the cable 34 into the connector 94. The fluid flows from the connector 94 out of the radially-extending holes 106 into the cavity 108. The fluid flows past the fins 103 of the thermal energy sink 98 towards the cavity 111. As the fluid flows past the fins 103 of the thermal energy sink 98, the fluid convectively transfers the thermal energy away from the thermal energy sink 98. The fluid then flows from the cavity 111 into the radially-extending holes 110 into the annularly-extending channel 112. The fluid flows from the annularly-extending channel 112 into the inner channels 114 of the torch head 102 and out of the holes 118. This flow pattern serves the dual purpose of directing the heat away from the thermal energy sink 98 via convective heat transfer and, in the case where the fluid is a shielding gas, also provides a shielding gas to the welding surface to reduce the formation of oxides during the welding process. Uniquely, the handle 85 both provides a location for gripping the welding implement as well as forms a portion of the channel through which the fluid, such as a shielding gas may flow. As shielding gases must typically be delivered to the site of the weld anyway, it is advantageous that the shielding gas can also be used to transfer the thermal energy transmitted to the heat pipe or thermal energy sink.

Figure 9:
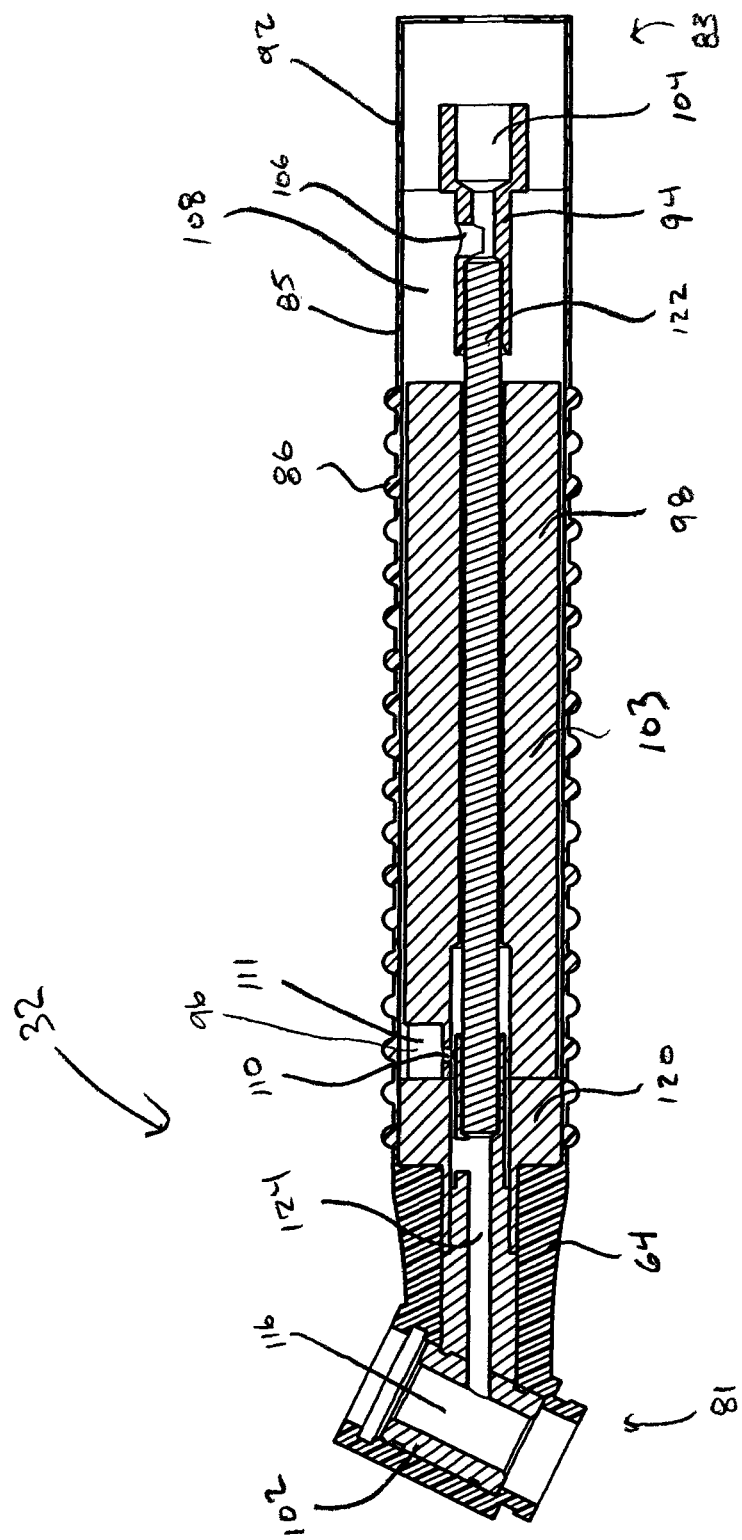
FIG. 9 is a cross-sectional side view of the torch of FIG. 7 along line 9-9.

Referring now to FIGS. 7-9, another configuration of the welding implement is shown. In this configuration, the welding torch 32 again has a torch body 64 connected to a handle 85. However, as is shown in FIG. 9, the torch body 64 and the handle 85 are each connected to a connecting block 120, which also acts as part of the thermal energy sink. The other exterior features, such as the removable cap 92 and the plurality of ribs 86 on the handle 85, are generally present.

FIGS. 8 and 9, which illustrate the components inside the torch body 64 and handle 85 show that, as previously described, the connecting block 120 attaches to both the torch body 64 and the handle 85. However, in this configuration, there are four heat pipes 96 that extend from the outer edges of the torch head 102 back through the connecting block 120 and to the end of the thermal energy sink 98.

Again, the connector 94 is adapted for connection to a cable that supplies gas and power. However, in this configuration, there is only a single radially-extending hole 106 extending from a location inside the connector 94 to the cavity 108. Instead of the connector 94 connecting to a heat pipe, the connector 94 connects to a conductive rod 122.

The conductive rod 122 extends from the connector 94 towards the torch head 102. The thermal energy sink 98 including the fins 103 is located around the conductive rod 122 and may, but does not necessarily, contact the conductive rod. The thermal energy sink 98 may be integrally formed with the connecting block 120. Again, the thermal energy sink 98 has a geometry, such as including the fins 103, that allows the cavity 108 to be in communication with the cavity 111. The cavity 111 is located on the side of the connecting block 120 opposite the torch head 102. There is a radially-extending hole 110 that extends between the cavity 111 and the channel 124. The channel 124 leads from an area of connection around the thermal energy sink 98 and the connection point of the conductive rod 122 and the torch body 64 into the torch head 102 and inner bore 116 of the torch head 102.

In operation, a gas and power supply cable 34 of FIGS. 1 and 2 is connected to the connector 94, to supply a gas and current to the torch 32. The current supplied by the cable 34 is conducted and travels through the connector 94 to the conductive rod 122 and into the torch head 102. As this current is conducted through these components, these components generate thermal energy.

This thermal energy is particularly great at the torch head 102 near the location of the welding. The four heat pipes 96 transfer the thermal energy in the torch head 102 away from the torch head 102, through the connecting block 120, and to a location at or around the thermal energy sink 98. The thermal energy generated by the various components may be directed towards the thermal energy sink 98 through either contact with the conductive rod 122 or contact with the connecting block 120.

The gas runs from the connector 94 through the cavity 108, past the thermal energy sink 98 to the cavity 111, through the radially-extending hole 110 through the channel 124, and into the inner bore 116. As the gas passes the thermal energy sink 98, the gas transfers the thermal energy of the thermal energy sink 98 convectively out of the welding torch 32. Additionally, this gas may be an inert shielding gas and protect the welding area from oxidation at high temperatures. In this way, the welding process may occur for a longer period of time with out the welding torch 32 becoming excessively hot and reducing or eliminating the downtime to cool.

It should be appreciated that, although two configurations were described above, other modifications may be made to the welding implement. For example, a separate hollow channel for carrying the shielding gas may extend from the connecting block 120 towards the torch head 102 and connect directly to the torch head 102 or to a channel near the torch head 102. In this case, the heat pipe or conductive rod may extend from the connector 94 directly into a portion of the torch head 102.

Moreover, it is contemplated that a wide variety of fluids, whether a gas or liquid, could be used to transfer the thermal energy away from the thermal energy sink 98. For example, the fluid may be a liquid that cycles through portions of the welding implement and, in particular, around the thermal energy sink 98, to transfer the thermal energy out of the welding implement. Of course, the term fluid is inclusive of the inert shielding gas as described in the above configuration.

The present invention has been described in terms of the various embodiments, and it should be appreciated that many equivalents, alternatives, variations, and modifications, aside from those expressly stated, are possible and within the scope of the invention. Therefore, the invention should not be limited to a particular described embodiment.

We claim:

1. A welding implement coupleable to a power supply that is capable of delivering a welding current to the welding implement and imparting a thermal energy to the welding implement, comprising:
   a body having a proximal end and a distal end, the proximal end coupleable to the power supply;
   a head proximate the distal end of the body to receive the thermal energy imparted to the welding implement from the power supply;
   a heat pipe, the heat pipe having a closed passage contained within the welding implement, a casing surrounding the dosed passage, a wick covering at least a portion of an interior surface of the casing, and a vapor cavity located inside the casing and in communication with the wick, the casing to carry the welding current received from the power supply to the head, the heat pipe containing a working fluid in thermal communication with the head to extract at least a portion of the thermal energy from the head; and
   a fluid channel extending over at least a portion of an exterior of the heat pipe to receive a cooling fluid flowing from the proximal end toward the welding implement.

2. The welding implement of claim 1, further comprising a plurality of heat pipes, each of the plurality of heat pipes having a closed passage containing a working fluid in thermal communication with the head to extract at least a portion of the thermal energy from the head.

3. The welding implement of claim 1, further comprising at least one input into the fluid channel located proximate the proximal end and at least one output located proximate the head to direct the cooling fluid toward the welding implement.

4. The welding implement of claim 1, further comprising a handle having an inner surface that forms at least a portion of the fluid channel.

5. The welding implement of claim 1, further comprising a thermal energy sink contacting at least a portion to the heat pipe.

6. The welding implement of claim 1, wherein the casing is formed of a conductive material configured to carry the welding current.

7. A welding implement comprising:
   a torch having a proximal end and a distal end, the proximal end adapted for connection to a power supply, the torch having a torch head formed proximate the distal end of the torch, the torch head adapted for holding an electrode;

a heat pipe forming a closed passage contained within the torch and extending substantially from the torch head toward the proximal end of the torch, the heat pipe, having a casing surrounding the dosed passage, a wick covering at least a portion of an interior surface of the casing and a vapor or cavity located inside the casing and in communication with the wick, the casing to carry a welding current received from the power supply to the torch head;

a handle surrounding at least a portion of the torch and at least a portion of the heat pipe; and a working fluid captured in the closed passage of the heat pipe that migrates within the torch between the torch head and the proximal end of the torch to transfer thermal energy away from the torch head.

8. The welding implement of claim 7, further comprising a channel formed between the handle and the heat pipe and at least one passage into the channel to direct a fluid therethrough to extract thermal energy from the heat pipe.

9. The welding implement of claim 7, further comprising a thermal energy sink contacting at least a portion the heat pipe.

10. The welding implement of claim 9, further comprising a channel formed between the handle and the thermal energy sink and at least one passage into the channel to direct a fluid therethrough to extract thermal energy from the heat pipe through the thermal energy sink.

11. The welding implement of claim 10, wherein the fluid includes at least one of a shielding gas and a liquid coolant.

12. The welding implement of claim 10, further comprising at least one passage extending from the channel toward the electrode to allow the fluid to pass from the channel.

13. The welding implement of claim 7, wherein the working fluid includes at least one of water, helium, mercury, sodium, ammonia, ethanol, and methanol.

14. A method for extracting heat from a welding implement including a torch having a proximal end and a distal end, a torch head formed proximate the distal end, and a heat pipe contained within the torch and substantially extending from the distal end of the torch to the proximal end of the torch and containing a working fluid, the heat pipe having a casing surrounding a closed passage, a wick covering at least a portion of an interior surface of the casing, and a vapor cavity located inside the casing and in communication with the wick, the method comprising the steps of:

transferring a thermal energy from the torch head to the working fluid contained in the heat pipe;

evaporating at least a portion of the working fluid contained in the heat pipe;

directing the at least a portion of the working fluid that has evaporated from a location in the heat pipe proximate the torch head to a location in the heat pipe proximate the proximal end of the torch;

transferring the thermal energy from the working fluid contained in the heat pipe at a location proximate the proximal end of the torch;

directing a fluid about an exterior of the heat pipe to extract thermal energy therefrom and condense the working fluid at the location in the heat pipe proximate to the proximal end of the torch; and carrying a welding current through the casing from the proximal end of the torch to the distal end of the torch.

15. The method of claim 14, wherein the step of transferring the thermal energy from the working fluid in the heat pipe at a location proximate the proximal end of the torch includes transferring the thermal energy from the heat pipe to a thermal energy sink located at the proximal end of the torch.

16. The method of claim 14, further comprising the step of transferring the thermal energy from at least a portion of a thermal energy sink attached to the heat pipe to the fluid to direct the thermal energy away from the portion of the thermal energy sink.

17. The method of claim 16, wherein the step of directing a fluid about the exterior of the heat pipe includes directing a shielding gas through a channel formed between a handle and at least one of the thermal energy sink and the heat pipe to convectively transfer the thermal energy away from at least one of the thermal energy sink and the heat pipe to the shielding gas.

18. The method of claim 14, wherein the fluid includes a shielding gas.

19. The method of claim 14, wherein the fluid includes a liquid coolant.

20. The method of claim 14, further comprising the step of wicking of the working fluid back to a location proximate the torch head via the wick.

* * * * *

UNITED STATES PATENT AND TRADEMARK OFFICE
CERTIFICATE OF CORRECTION

PATENT NO. : 8,872,071 B2  Page 1 of 1
APPLICATION NO. : 12/116784
DATED : October 28, 2014
INVENTOR(S) : Richard Mark Achtner et al.

It is certified that error appears in the above-identified patent and that said Letters Patent is hereby corrected as shown below:

In the Claims

Column 8, Claim 1, Line 32, "dosed" should be --closed--.

Column 9, Claim 7, Line 4, "dosed" should be --closed--.

Signed and Sealed this
Tenth Day of February, 2015

Michelle K. Lee
*Deputy Director of the United States Patent and Trademark Office*